United States Patent
Agrawal

(10) Patent No.: US 10,554,409 B2
(45) Date of Patent: Feb. 4, 2020

(54) SYSTEMS AND METHODS FOR USE IN AUTHENTICATING USERS IN CONNECTION WITH NETWORK TRANSACTIONS

(71) Applicant: MASTERCARD INTERNATIONAL INCORPORATED, Purchase, NY (US)

(72) Inventor: Rahul Agrawal, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 168 days.

(21) Appl. No.: 15/646,292

(22) Filed: Jul. 11, 2017

(65) Prior Publication Data
US 2019/0020481 A1    Jan. 17, 2019

(51) Int. Cl.
*H04L 9/32*   (2006.01)
*G06F 21/32*   (2013.01)
*G06F 21/31*   (2013.01)

(52) U.S. Cl.
CPC ............ *H04L 9/3226* (2013.01); *G06F 21/32* (2013.01); *H04L 9/3231* (2013.01); *G06F 21/31* (2013.01); *H04L 9/32* (2013.01)

(58) Field of Classification Search
CPC ....... H04L 9/3226; H04L 9/3231; H04L 9/32; G06F 21/32; G06F 21/31
See application file for complete search history.

(56) References Cited

U.S. PATENT DOCUMENTS

| | | | | |
|---|---|---|---|---|
| 8,595,808 | B2 * | 11/2013 | Langley | ................ H04L 63/126 726/7 |
| 8,618,911 | B2 * | 12/2013 | Adams | .................... G06F 21/35 340/5.83 |
| 9,727,862 | B2 * | 8/2017 | O'Connell | ......... G06Q 20/3821 |
| 2003/0171995 | A1 * | 9/2003 | Dezonno | ............ G06Q 30/0611 705/26.4 |
| 2004/0030660 | A1 | 2/2004 | Shatford | |
| 2005/0194452 | A1 | 9/2005 | Nordentoft et al. | |
| 2006/0136332 | A1 * | 6/2006 | Ziegler | ................... G06F 21/31 705/39 |
| 2009/0063345 | A1 | 3/2009 | Erikson | |

(Continued)

FOREIGN PATENT DOCUMENTS

WO    WO2016/006924    1/2016

*Primary Examiner* — Saleh Najjar
*Assistant Examiner* — Louis C Teng
(74) *Attorney, Agent, or Firm* — Harness, Dickey & Pierce, P.L.C.

(57) ABSTRACT

Systems and methods are provided for use in authenticating a user in connection with a network transaction, based on a biometric personal identification number (PIN). One exemplary method includes intercepting a request associated with a network transaction. The request includes a series of biometric data associated with a user. The exemplary method also includes verifying the series of biometric data and converting, by the computing device, the series of biometric data to an actual personal identification number (PIN) where the actual PIN includes a series of characters. The method then further includes appending the actual PIN to the request, and transmitting the request to an entity, thereby permitting the entity to authenticate the user, at least in part, based on the actual PIN.

18 Claims, 4 Drawing Sheets

(56) References Cited

U.S. PATENT DOCUMENTS

| | | |
|---|---|---|
| 2009/0216676 A1 | 8/2009 | Mathur et al. |
| 2013/0324089 A1 | 12/2013 | Kim et al. |
| 2014/0297852 A1* | 10/2014 | Shimizu ................ H04L 7/0016 709/224 |
| 2015/0036065 A1 | 2/2015 | Yousefpor et al. |
| 2015/0332273 A1* | 11/2015 | Bruno .............. G06Q 20/40145 705/44 |
| 2016/0364703 A1* | 12/2016 | Bhatt ................... G06Q 20/105 |
| 2018/0077147 A1* | 3/2018 | Kelsey ................ H04L 63/0428 |

* cited by examiner

SYSTEMS AND METHODS FOR USE IN AUTHENTICATING USERS IN CONNECTION WITH NETWORK TRANSACTIONS

FIELD

The present disclosure generally relates to systems and methods for use in authenticating users to accounts in connection with network transactions, and in particular, to authenticating the users based on biometric personal identification numbers (PINs) and to assignment of the biometric PINs to the users.

BACKGROUND

This section provides background information related to the present disclosure which is not necessarily prior art.

Consumers often use payment accounts to purchase products (e.g., goods and services, etc.) from merchants. When using the payment accounts, the consumers are known to be invited, or required, to authenticate themselves to the payment accounts (or corresponding payment devices) at the time of the purchases. The authentication of a consumer may be based on presentation of photo identification (e.g., a driver's license, a passport, etc.). Alternatively, the authentication may be based on entry of a personal identification number (PIN), etc., or presentation of a biometric, where the PIN or the biometric is then confirmed for the consumer's payment account (e.g., by being a PIN associated with the payment account, or by comparison of the biometric to a reference biometric associated with the payment account, etc.). When the consumer is authenticated, one or more transactions directed to the consumer's payment account may be initiated and/or approved by an issuer or other entity associated with the payment account.

DRAWINGS

The drawings described herein are for illustrative purposes only of selected embodiments and not all possible implementations, and are not intended to limit the scope of the present disclosure.

Figure 1:
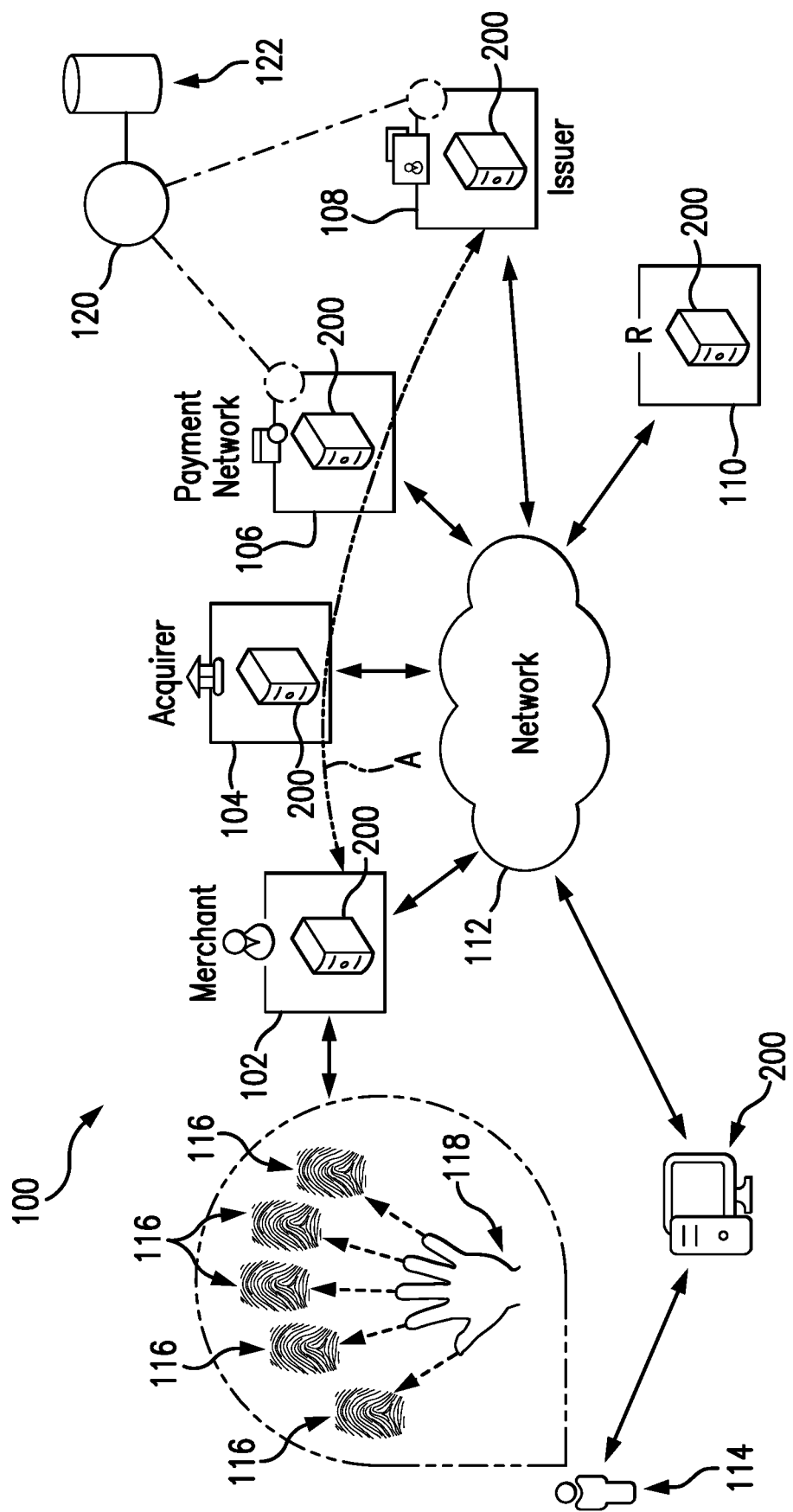
FIG. 1 is a block diagram of an exemplary system of the present disclosure suitable for use to authenticate a consumer to a payment account, based on presentation of a biometric personal identification number (PIN)
Figure 3:
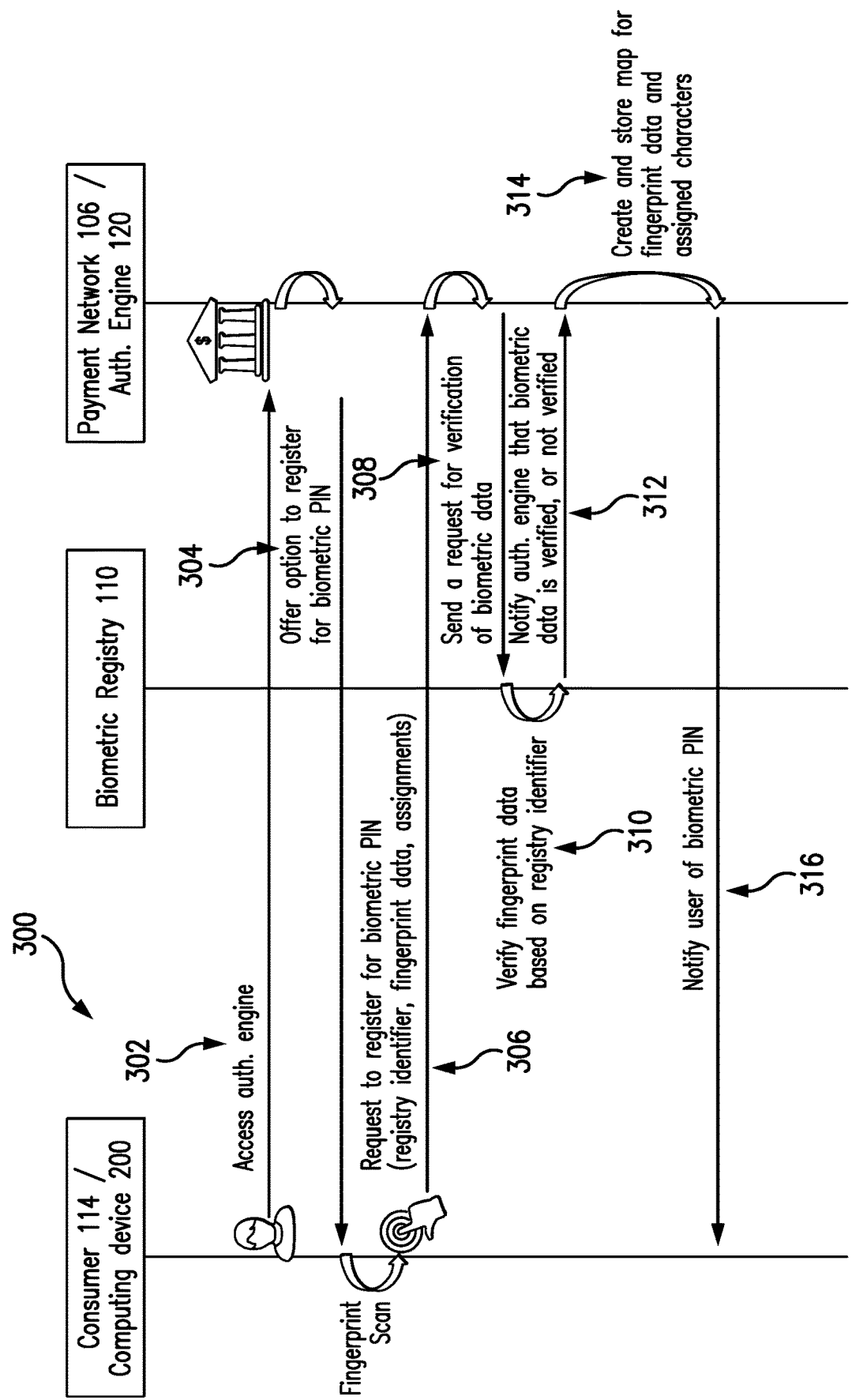
Figure 4:
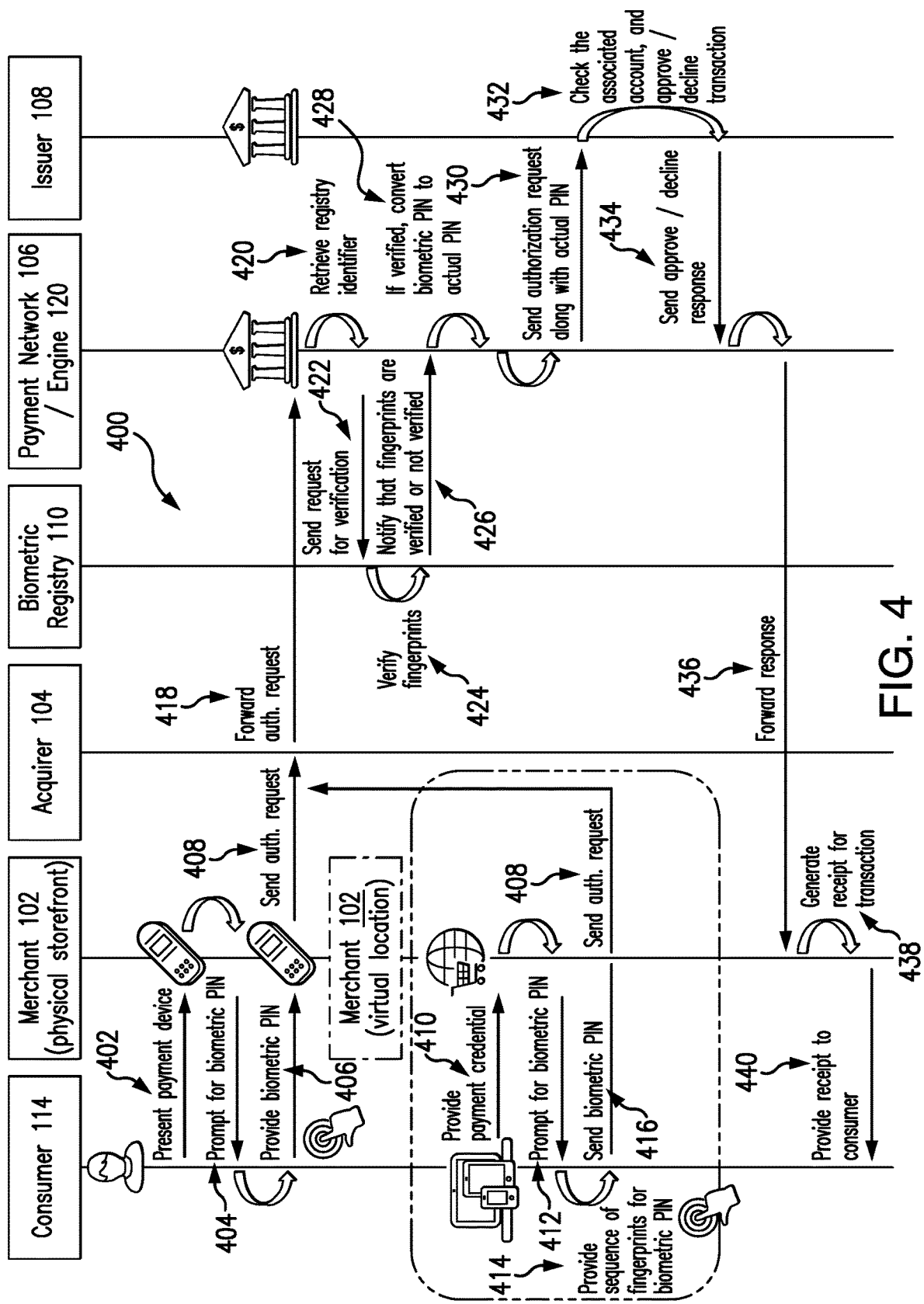

FIG. 3 is an exemplary method that may be implemented in the system of FIG. 1 for use in registering a consumer for a biometric PIN; and FIG. 4 is an exemplary method that may be implemented in the system of FIG. 1 for use in authenticating the consumer in connection with a payment account transaction by the consumer, based on presentation of the biometric PIN, for example, as registered to the consumer in the method of FIG. 3.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are often used by consumers (broadly, users) to fund transactions for products (e.g., goods and/or services, etc.) at merchants (e.g., payment account transactions, etc.). In connection with the transactions, the consumers are often authenticated to the payment accounts and/or to payment devices associated therewith, whereby the merchants and/or issuers associated with the payment accounts gain confidence in approving and/or permitting the transactions. In certain implementations, mechanisms by which consumers are authenticated may be cumbersome and/or subject to simulation and/or theft by fraudsters. Uniquely, the systems and methods herein permit consumers to be authenticated through biometric personal identification numbers (PINs), which include multiple biometrics of the consumers in sequence (i.e., in order). In particular, a consumer registers for a biometric PIN, where each biometric associated with the biometric PIN is assigned a character (e.g., a number, etc.). Then, in connection with a transaction using his/her payment account, the consumer is prompted to enter the biometric PIN, whereby the consumer enters his/her PIN for the payment account by sequentially presenting the biometric corresponding to each character of his/her PIN. Each received biometric is then verified and, once verified, converted to the character assigned thereto. When all received biometrics are verified, the characters then form an actual PIN, which is provided to an issuer of the consumer's payment account as part of the approval process for the transaction. Specifically, when the actual PIN matches the PIN associated with the payment account, the consumer is authenticated and the transaction is permitted to continue (e.g., is permitted to be approved by the issuer, etc.). In this manner, the authentication of the consumer is strengthened because it relies on biometrics and, further, because it requires not just one biometric but a sequence of multiple biometrics as representative of a PIN, thereby improving fraud prevention associated with the payment account.

FIG. 1 illustrates an exemplary system 100 in which the one or more aspects of the present disclosure may be implemented. Although the system 100 is presented in one arrangement, other embodiments may include systems arranged otherwise depending, for example, on the manner in which transactions are authenticated, on the manner in which the payment network interacts with (or includes) a registry of biometrics, etc.

As shown in FIG. 1, the system 100 generally includes a merchant 102, an acquirer 104 associated with the merchant 102 (and configured to process purchase transactions performed at the merchant 102), a payment network 106, an issuer 108 configured to issue payment accounts to consumers, and a biometric registry 110 (all broadly entities), each coupled to (and in communication with) network 112. The network 112 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 112 may include multiple different networks, such as a private payment transaction network made accessible by the payment network 106 to the acquirer 104 and the issuer 108 and, separately, the public Internet, which is accessible as desired to the merchant 102, the payment network 106, the registry 110, etc.

The merchant 102 is configured to offer and sell products (e.g., goods, services, etc.) to consumers, including, for example, consumer 114. The products may include any suitable and/or desired products within the scope of the present disclosure. In connection therewith, the merchant 102 is generally associated with one or more physical locations (i.e. a physical storefront, etc.) and/or one or more network-based locations (e.g., websites, mobile applications, etc.) (i.e., a virtual storefront, etc.), through which the products are offered for sale and/or are sold to consumers, including the consumer 114.

In the exemplary embodiment, the consumer 114 is associated with a payment account issued by the issuer 108. In addition, the consumer 114, as a person, includes conventional biometrics, such as, for example, fingerprints 116 and palm prints, etc. The fingerprints 116, for example, are substantially unique to the consumer 114, and thus, may be used to authenticate the consumer 114 as compared to other consumers and/or persons attempting to use the payment account issued to the consumer 114. In particular, as shown in the dotted circle in FIG. 1, the consumer 114 has a right hand 118 with five fingers (i.e., a thumb and index, middle, ring, and pinky fingers), where each finger is associated with a fingerprint 116. The consumer 114 also has a left hand (not shown) with five fingers, and with each finger of the left hand also associated with a fingerprint 116. As such, the consumer 114 has ten unique fingerprints 116 (broadly, biometrics) that may potentially be used as described herein. It should be appreciated that while the embodiments herein are described with reference to the consumer's fingerprints 116, other biometrics may also (or additionally) be used to provide a biometric PIN as described herein (e.g., retina scans, facial scans, voice scans, etc., in combination and/or in combination with the fingerprints 116, or separate therefrom; etc.).

The registry 110 in the system 100 includes a registry of biometrics for multiple persons, including, in this example, the consumer 114. The registry 110 may include, for example, a government registry associated with a social service, or otherwise, which relies on and/or stores biometric information about different participants and/or registrants to ensure the social service or other service or benefit derived from authentication of the person, by the registry 110, is provided to the appropriate person. The registry 110 generally includes, at least in this embodiment, a data structure, which is organized by registry identifiers for the persons (e.g., unique identification (UID) numbers for the persons, such as Aadhaar numbers associated with the Unique Identification Authority of India (UIDA), or other suitable identifiers, etc.). Each of the registry identifiers is associated with a biometric data set (i.e., reference biometric data) for a person (e.g., for the consumer 114, etc.) (e.g., as retrieved for or obtained from the person by the authority responsible for the registry 110, etc.), whereby the data structure includes multiple biometric data sets for multiple persons. In connection therewith, each registry identifier is provided to a person to which it relates (e.g., the consumer 114, etc.) and is associated with the person's biometric data set included in the data structure, so that the person may provide his/her registry identifier in connection with requesting services from a desired provider, for example, and authentication of the person in connection therewith.

It should be appreciated that the registry 110 may include fingerprint data, or other types of biometric data (e.g., the other types of biometric data described above, other biometric data, etc.) for use as described herein (e.g., for use as reference biometric data, etc.). And, it should be appreciated that while the registry 110 is illustrated in FIG. 1 as separate from the payment network 106 and separate from authentication engine 120, the registry 110 may be incorporated and/or integrated at least partly in one or both of these parts of the system 100 in other system embodiments (e.g., as a registry generated and facilitated by the payment network 106, etc.).

With continued reference to FIG. 1, the authentication engine 120 of the system 100 is configured, by executable instructions, to operate as described herein. In addition, the authentication engine 120 is shown in FIG. 1 as a standalone part of the system 100, and is generally consistent with computing device 200 described below. Alternatively, however, and as indicated by the dotted lines in FIG. 1, the authentication engine 120 may be incorporated into (or associated with), in whole or in part, the payment network 106 or the issuer 108. In one specific embodiment, for example, the authentication engine 120 is incorporated, in part, in the payment network 106 (e.g., to map the consumer's fingerprints to numbers, etc.) and in part in the issuer 108 (e.g., to compare the mapped numbers to an actual PIN associated with the consumer's payment account, etc.), etc. In addition, the authentication engine 120 is coupled to a data structure 122, which may be standalone from the authentication engine 120 or, again as indicated by the dotted lines, may be incorporated in whole, or in part, with the authentication engine 120. The data structure 122 includes, at the least, maps defining assignments between fingerprints, for example, and characters (e.g., numbers, letters, etc.) assigned by consumers (e.g., by the consumer 114, etc.) to their fingerprints during registration of the consumers to the authentication engine 120 for the biometric PIN services described herein.

With that said, in operation in the system 100, the consumer 114 initially registers to the authentication engine 120 in order to permit and/or facilitate authentication of the consumer 114 in future transactions based on use of a biometric PIN. Such registration may be done after the payment account is issued to the consumer 114 by the issuer 108, or in connection with such issuance. Specifically, the consumer 114 accesses the authentication engine 120, for example, through a network-based application (e.g., a website, mobile application, etc.) associated with the payment network 106 and/or the issuer 108. The consumer 114, then, via the network-based application, requests to register a biometric PIN for use with his/her payment account.

As part of the registration request, the consumer 114 provides to the authentication engine 120 his/her registry identifier for the registry 110 (as assigned by the authority responsible for the registry 110, etc.), along with an assignment of a particular desired character for each biometric desired to be used by the consumer 114 in his/her biometric PIN. The assignment may include, for example, an assignment of a number to each fingerprint to be provided by the consumer 114 in connection with the registration (e.g., to each fingerprint provided by the consumer 114 to the authentication engine 120 via a fingerprint scanner at a computing device 200 associated with the consumer 114, etc.), etc.

In particular, in the illustrated system 100, the consumer 114 may assign the number "3" to the fingerprint 116 of the index finger of his/her right hand 118, the number "8" to the fingerprint 116 of the middle finger of his/her right hand 118, the number "1" to the fingerprint 116 of the ring finger of his/her right hand 118, and the number "4" to the fingerprint 116 of the pinky finger of his/her right hand 118, where the resulting actual PIN selected by the consumer 114 may then be "8341" as associated with the fingerprints for his/her right-hand middle finger, index finger, pinky finger, and ring finger (as the biometric PIN). However, it should be appreciated that in assigning the numbers, the different fingers of the consumer's right hand 118 may not necessarily be indicated by name, but may generally be indicated by sample fingerprint data, which is captured for the consumer 114 at a suitable computing device (e.g., the fingerprint scanner at the computing device 200 associated with the consumer 114, a scanner associated with the issuer 108, a scanner associated with the merchant 102, etc.) and included in the registration request. As such, the request may include, for example, fingerprint data #1, fingerprint data #2, fingerprint data #3, and fingerprint data #4, (i.e., a sequence of fingerprint data) and also the numbers 3, 8, 1, and 4 (i.e., a sequence of numbers) associated therewith. In general, the sequence of fingerprint data will include, at least, a number of fingerprints equal to a number of characters, or unique characters, in an actual PIN for an account (with repeat characters potentially represented by the same one fingerprint, or potentially by multiple different fingerprints). So, for example, an actual PIN of "2323" may include assignment of only two fingerprints, while an actual PIN of "123456789" (i.e., a PIN comprising nine unique characters) would necessitate nine different fingerprints being assigned. That said, in at least one example, the consumer 114 may assign the same characters to multiple fingers, where, for example, the actual PIN of "2323" may be provided by fingerprints for his/her index finger (right hand), middle finger (right hand), index finger (right hand), and ring finger (left hand) (i.e., where both the middle finger on the right hand and the ring finger on the left hand are assigned the number "3," while the index finger on the right hand is assigned the number "2," etc.). Thus, as illustrated by these examples, the biometric PIN of "2323" may be entered by use of two fingers (i.e., by the consumer's index finger (right hand) and middle finger (right hand)) or by use of three fingers (i.e., by the consumer's index finger (right hand), middle finger (right hand), and ring finger (left hand)), etc. In at least one other embodiment, the consumer's biometric PIN may include one character, which is assigned to one finger, where the consumer 114 presents the same fingerprint multiple times to provide the biometric PIN (e.g., as above, four index finger fingerprints (right hand) to provide "2222"), etc.).

Upon receipt of the request, the authentication engine 120 is configured to provide the registry 110 with the registry identifier for the consumer 114 and the fingerprint data received from the consumer 114 for the consumer's biometric PIN. The registry 110, in turn, is configured to verify the fingerprint data and to transmit a response, to the authentication engine 120, indicating that the fingerprint data is either verified or not verified. When the fingerprint data is verified, the authentication engine 120 is configured to create a map between the fingerprint data (or corresponding finger) and the corresponding numbers (or other characters) provided (or assigned) by the consumer 114, and to store the map in the data structure 122. In so doing, the authentication engine 120 is configured to associate the map, in the data structure 122, with the consumer's payment account and with the consumer's registry identifier (e.g., based on a primary account number (PAN) for the payment account, a token for the payment account, etc.). Table 1 illustrates an exemplary map of fingerprint data and corresponding numbers assigned thereto (e.g., by the consumer 114, etc.), as may be stored in the data structure 122.

TABLE 1

| Index Fingerprint | 3 |
|---|---|
| Middle Fingerprint | 8 |
| Ring Fingerprint | 1 |
| Pinky Fingerprint | 4 |

It should be appreciated that the assignment of fingerprint data above is merely exemplary, as other fingerprints for other fingers, or other biometrics in general, may be assigned to characters (including numbers, letters, etc.) of biometric PINs in other embodiments.

Then in the system 100, in connection with a payment account transaction by the consumer 114 at the merchant 102, for example, the consumer 114 is invited to provide his/her biometric PIN for purposes of authentication. In response, the consumer 114 provides the fingerprint data, in the order corresponding to his/her PIN for the payment account (i.e., through presentation of a series or sequence of biometric data), to the merchant 102, via a point-of-sale (POS) terminal. The merchant 102, in turn, communicates an authorization request (including the biometric PIN, for example, the fingerprints 116 for the consumer's right-hand middle finger, index finger, pinky finger, and ring finger) for the transaction to the acquirer 104, through the network 112, along path A in FIG. 1. In this exemplary embodiment, the biometric data associated with the consumer's biometric PIN is included at data element 105 (or DE 105) of the authorization request (and, again in this particular example, is maintained therein, in encrypted form, when the authorization request is ultimately sent to the issuer 108). However, it should be appreciated that the biometric data may be included elsewhere in the authorization request in other embodiments (e.g., in other data elements, etc.), or even removed therefrom by the payment network 106 when the actual PIN is appended to the authorization request (as described more below).

In turn, the acquirer 104 communicates the authorization request (including the biometric data and biometric PIN) to the payment network 106. At this point, the authentication engine 120 is configured to intercept the authorization request and to pull out the biometric PIN. For example, the authentication engine 120 may be configured to intercept the authorization request when the PAN for the consumer's payment account, as included in the authorization request, is within a range of PANs for payment accounts available for use of biometric PIN authentication (e.g., is within a range of PANs for particular payment accounts provided by the issuer 108 and being associated with biometric PIN authentication, etc.) (e.g., as determined by the authentication engine 120, as determined by an edge device at the payment network 106, as determined by an interface processing device associated with the payment network 106 and located at the acquirer 104, combinations thereof, etc.). Alternatively, the authentication engine 120 may be configured to intercept the authentication request when the PAN for consumer's payment account, as included in the authorization request, is identified in a listing of PANs for payment accounts registered for use of biometric PIN authentication (i.e., is identified in a listing of PANs for payment accounts registered to the authentication engine 120) (e.g., as determined by the authentication engine 120, as determined by an edge device at the payment network 106, as determined by an interface processing device associated with the payment network 106 and located at the acquirer 104, combinations thereof, etc.). In any case, once the authorization request is intercepted, the authentication engine 120 is also configured to retrieve the registry identifier for the consumer 114 from the data structure 122 based on the payment account identified in the authorization request (e.g., based on the PAN for the payment account, a token for the payment account, etc.). The authentication engine 120 is configured to then send the registry identifier for the consumer 114 (as retrieved from the data structure 122) and the biometric PIN (e.g., the sequence of fingerprints, or fingerprint data, included in the authorization request; etc.) to the registry 110. In response, the registry 110 is configured to verify the fingerprint data, based on the biometric data set (stored therein) corresponding to the registry identifier for the consumer 114, and provide a notification back to the authentication engine 120 indicating whether the fingerprint data associated with the biometric PIN is verified, or not.

When the fingerprint data associated with the biometric PIN is verified, the authentication engine 120 is configured to map the fingerprint data to the characters assigned by the consumer 114, based on the map stored in the data structure 122, and to include the actual PIN in the authorization request. The authentication engine 120, and more generally, the payment network 106, is configured to then transmit and/or pass the authorization request (with the actual PIN included therein) to the issuer 108. In this exemplary embodiment, the authentication engine 120 and/or the payment network 106 may be configured to further append a biometric authentication indicator to the authorization request (e.g., at DE 48, sub-element 17, etc.) having a value of "1" or "2" (or some other suitable value or indicator) to indicate that biometric authentication has been performed. That is, the authentication engine 120 is configured to authenticate the consumer 114 based on the biometric data in the biometric PIN, and thus is able to append the indicator to the authorization request indicating that a biometric match of the consumer 114 occurred at the time of the transaction, or not.

It should be appreciated that in at least one embodiment, rather than passing the biometric data to the issuer 108, the biometric data is removed from the authorization request (or other message directed to the issuer 108) (whereby the issuer 108 relies on the actual PIN and/or the biometric authentication indicator).

The issuer 108 then verifies the actual PIN as associated with the consumer's payment account and determines if the payment account is in good standing and if there is/are sufficient credit/funds to complete the transaction, etc. The issuer 108 may further rely on the biometric authentication indicator (or actual biometric data for the consumer 114), when included in the authorization request, to approve the transaction. As such, the issuer 108 in turn responds with an authorization reply to the merchant 102, again, generally along path A, approving or declining the transaction. The merchant 102 is able to proceed as appropriate. If the transaction is approved, the transaction is later cleared and settled by and between the merchant 102 and the acquirer 104 and by and between the acquirer 104, the payment network 106, and the issuer 108 (in accordance with settlement arrangements, etc.).

While only one consumer 114, one merchant 102, one acquirer 104, one issuer 108, and one registry 110 are shown in the system 100 in FIG. 1 (for ease of illustration), it should be appreciated that a different number of these entities, parts and/or persons may be included in the system 100, or may be included as a part of systems in other embodiments, consistent with the present disclosure. Likewise, it should be understood that multiple consumers may be associated with implementation of the features described herein, despite only consumer 114 being illustrated in FIG. 1.

Figure 2:
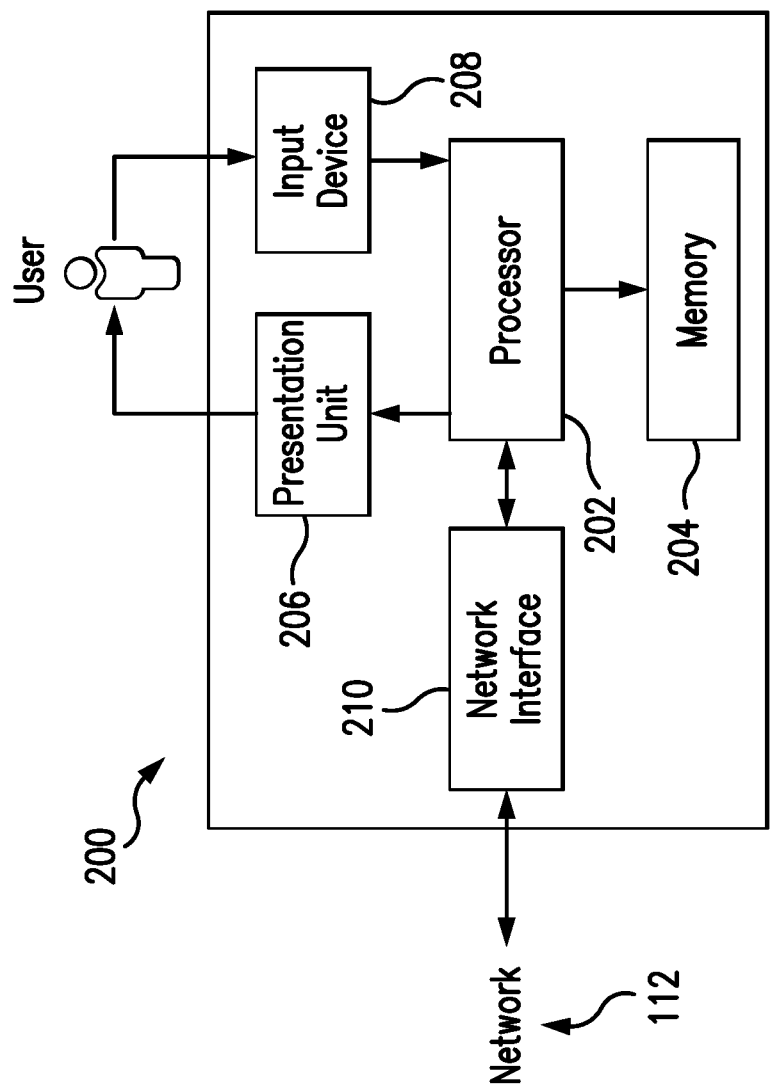
FIG. 2 is a block diagram of a computing device that may be used in the exemplary system of FIG. 1.

FIG. 2 illustrates an exemplary computing device 200 that may be used in the system 100. The computing device 200 may include, for example, one or more servers, workstations, personal computers, laptops, tablets, smartphones, PDAs, terminals, etc. In addition, the computing device 200 may include a single computing device, or it may include multiple computing devices located in close proximity or distributed over a geographic region, so long as the computing devices are specifically configured to function as described herein. In the system 100 of FIG. 1, each of the entities, i.e., the merchant 102, the acquirer 104, the payment network 106, the issuer 108, and the registry 110 are illustrated as including, or being implemented in, a computing device 200, coupled to (and in communication with) the network 112. In addition, as shown in FIG. 1, the consumer 114 is associated with a computing device 200, which may be coupled to (and in communication with) the network 112. That said, the system 100, or parts thereof, should not be understood to be limited to the computing device 200, as other computing devices may be employed in other system embodiments. In addition, different components and/or arrangements of components may be used in other computing devices.

Referring to FIG. 2, the exemplary computing device 200 includes at least one processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable storage media. The memory 204 may be configured to store, without limitation, biometric-character maps, fingerprint data, authorization requests/replies, biometric PINs, actual PINs, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the operations or processes described herein.

In the exemplary embodiment, the computing device 200 includes a presentation unit 206 that is coupled to (and that is in communication with) the processor 202 (however, it should be appreciated that the computing device 200 could include output devices other than the presentation unit 206, etc.). The presentation unit 206 outputs information (e.g., requests to register biometric PINs, etc.), either visually or audibly to the consumer 114 at the computing device 200, for example. Various interfaces (e.g., as defined by network-based applications, etc.) may be displayed at the computing device 200 (to a user of the given computing device 200), and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, request to assign biometric PINs, biometric inputs, etc., or inputs from other computing devices. The input device 208 is coupled to (and is in communication with) the processor 202 and may include, for example, a keyboard, a pointing device, a mouse, a stylus, a biometric reader (e.g., a fingerprint reader, a retina scanner, a voice recognition reader, etc.), a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 112. Further, in some exemplary embodiments, the computing device 200 includes the processor 202 and one or more network interfaces incorporated into or with the processor 202.

FIG. 3 illustrates an exemplary method 300 for use in registering a biometric PIN for a consumer and/or payment account. The exemplary method 300 is described with reference to the authentication engine 120, the registry 110 and the consumer 114 of the system 100, and with additional reference to the computing device 200. However, the methods herein should not be understood to be limited to the exemplary system 100 or the exemplary computing device 200, and likewise, the systems and the computing devices herein should not be understood to be limited to the exemplary method 300.

In the method 300, the consumer 114 accesses the authentication engine 120, at 302. In particular, the consumer 114 may log-in to a network-based application associated with the authentication engine 120, directly (or indirectly, when the application is more broadly provided by the payment network 106). Then, upon access, the authentication engine 120 offers an option for the consumer 114 to register for a biometric PIN, at 304. The offer may be pushed to the consumer 114, through the network-based application, or may be presented in connection with a selection or other input from the consumer 114 to register for the biometric PIN. In response, at 306, the consumer 114 requests to register for the biometric PIN. In particular, the consumer 114 provides his/her registry identifier, which is associated with the registry 110 and with the biometric data set for the consumer 114 at the registry 110. In addition, the consumer 114 provides fingerprint data, via the computing device 200 and, specifically, via a fingerprint scanner input device 208 associated with the computing device 200, etc.

In connection therewith, the consumer 114 also provides an assignment for each finger/fingerprint provided to the authentication engine 120, or for multiple fingers/fingerprints, to desired characters, such as, for example, numbers, letters, etc. In the above example, the consumer 114 indicates that the index finger of the right hand is to be assigned to the number "3," the middle finger on the right hand 118 is to be assigned to the number "8," the ring finger is to be assigned to the number "1," and the pinky finger is to be assigned to the number "4," whereby the actual PIN desired by the consumer 114 is "8341." Thus, the request provided by the consumer 114 to register for the biometric PIN includes the consumer's registry identifier, the scanned fingerprint data for the consumer 114, and the assignment of characters to the scanned fingerprint data, all of which is transmitted (as part of the request), via the network-based application, from the consumer 114 (i.e., via the consumer's computing device 200) to the authentication engine 120.

Then, upon receipt of the request from the consumer 114, the authentication engine 120 sends a request for verification of the consumer's fingerprint data (as included in the request), to the registry 110, at 308. The request includes the received fingerprint data (e.g., the actual fingerprint data for each of the consumer's fingers, or a series of fingerprints for the consumer 114, etc.) and the consumer's registry identifier.

The registry 110, in turn, verifies the fingerprint data for the consumer 114 based on the registry identifier, at 310. In particular, the registry 110 retrieves the biometric data set corresponding to the registry identifier for the consumer 114 (as previously provided to the registry 110 by the consumer 114), and compares the retrieved biometric data set to the fingerprint data received from the authentication engine 120. The registry 110 then notifies, at 312, the authentication engine 120 that the fingerprint data is either verified or not verified, based on the comparison (e.g., based on whether there is a match between the fingerprint set and the received fingerprint data (i.e., within conventionally accepted standards and/or requirements, etc.), etc.).

When the fingerprint data is verified, the authentication engine 120 creates, at 314, a map for the fingerprint data and the assigned characters therefore and stores the map in the data structure 122. As described, Table 1 again illustrates an example of a map, which may be created for the consumer 114 and stored in the data structure 122, by the authentication engine 120, based on the exemplary assignments above. In addition, the authentication engine 120 further stores the registry identifier for the consumer 114 (as provided by the consumer 114 in the registration request) in the data structure 122, in association with the payment account of the consumer 114, such that, as described below, it may be subsequently retrieved for use in authenticating the consumer 114 using his/her biometric PIN in connection with a transaction directed to the consumer's payment account (e.g., based on the PAN for the consumer's payment account as included in an authorization request for the transaction, etc.). Thereafter, the authentication engine 120 notifies the consumer 114 of the successful creation of the biometric PIN, at 316, via the computing device 200 and/or the network-based application, etc.

Finally in the method 300, the authentication engine 120 identifies the consumer's payment account as enrolled with the authentication engine 120, whereby subsequent transactions involving the consumer's payment account will be flagged and directed to (and/or intercepted by) the authentication engine 120. In particular, for example (and as generally described above in the system 100), the PAN for the consumer's payment account may be appended to a list of PANs registered to the authentication engine 120. Thereafter, when an authorization request includes the PAN, as included in the registered list, the authentication engine 120 and/or payment network 106 intercepts the transaction, as described below in method 400. In one or more other embodiments, the consumer 114 may register with the authentication engine 120 in connection with applying for the payment account, whereby the PAN then assigned to the consumer 114 for the payment account is included in a range of PANs registered to the authentication engine 120. As a result, upon receipt of an authorization request for a transaction involving the consumer's payment account, the payment network 106 and/or authentication engine 120 may determine if the PAN is within the registered range in order to determine whether to intercept the authorization request.

FIG. 4 illustrates an exemplary method 400 for use in authenticating a consumer, in connection with a transaction by the consumer at a merchant, based on a biometric PIN assigned to the consumer (e.g., in the manner described in method 300, etc.). The exemplary method 400 is described with reference to the authentication engine 120, the merchant 102, the payment network 106, the issuer 108, and the registry 110 in the system 100, and with additional reference to the computing device 200. However, again, the methods herein should not be understood to be limited to the exemplary system 100 or the exemplary computing device 200, and likewise, the systems and the computing devices herein should not be understood to be limited to the exemplary method 400.

In this exemplary embodiment, initially, the consumer 114 attempts to make a purchase at a physical storefront of the merchant 102. In connection with the purchase attempt, the consumer 114 presents, at 402, a payment device associated with his/her payment account to the merchant 102, whereupon the payment device is provided to and/or read by the POS terminal (as shown in FIG. 4) at the merchant 102 (e.g., a payment account credential (e.g., the PAN, or a token, etc., for the payment account) is read from the payment device, etc.). The merchant 102 then, via the POS terminal, prompts, at 404, the consumer 114 to enter his/her biometric PIN for the payment account. In response, the consumer 114 provides the biometric PIN, at 406. In particular, and consistent with the above example in method 300, the actual PIN of "8341" may be associated with the consumer's payment account. In connection therewith, the consumer 114 registered his/her fingers to specific characters, or numbers (i.e., 8 is assigned to the middle finger (on the right hand), 3 to the index finger, 4 to the pinky finger and 1 to the ring finger, as indicated in Table 1) when requesting the biometric PIN. As such, to provide the biometric PIN to the merchant 102 as part of authenticating the user, in this example, the consumer 114 successively presents his/her right-hand middle finger to be scanned, by the POS terminal, then his/her right-hand index finger, then his/her right-hand pinky finger, and finally his/her right-hand ring finger (i.e., as a series or sequence of fingerprints). The merchant 102 receives the fingerprint data (broadly, receives the consumer's biometric PIN) from the consumer 114 for the four fingerprints, in order (as a sequence), and generates and sends an authorization request (including the biometric PIN), at 408, along to the acquirer 104. As indicated above in the system 100, the authorization request includes the fingerprint data received from the consumer 114, and may further include a transaction amount for the attempted purchase, a time, a date, an acquirer ID, the PAN associated with the consumer's payment account, an expiration date for the consumer's payment device, and/or other transaction data necessary and/or desired to approve or decline the transaction (all of which is collectively referred to as transaction data included in the authorization request).

Alternatively, as indicated by the dotted box in FIG. 4, the consumer 114 may attempt to purchase a product from the merchant 102, at a virtual storefront associated with the merchant 102. In connection with the attempt, the consumer 114 provides to the merchant 102, at 410, a payment account credential associated with the consumer's payment device and/or the payment account (e.g., manually or automatically (e.g., by scanning, etc.), etc.). The merchant 102, in response, prompts the consumer 114 for the biometric PIN, at 412. The consumer 114, via the computing device 200, provides the biometric PIN, at 414, consistent with the description above. Whereupon, the computing device 200 associated with the consumer 114 captures the sequence of four fingerprints (i.e. for the middle finger, index finger, pinky finger, and ring finger, in succession) and sends the fingerprint data to the merchant 102, at 416. In turn, as above, the merchant 102 receives the fingerprint data for the biometric PIN, and generates and sends an authorization request for the transaction (including the fingerprint data and other transaction data as described above), at 408, along to the acquirer 104.

Regardless of the manner of interaction between the consumer 114 and the merchant 102, in this exemplary embodiment, the acquirer 104 forwards the authorization request to the issuer 108, via the payment network 106, at 418. In so doing, the payment network 106 (and/or authentication engine 120 via the payment network 106) intercepts the authorization request (in the manner described above in the system 100 and in the method 300) and retrieves, at 420, the consumer's registry identifier, from the data structure 122, based on association of the payment account identified in the authorization request therewith (e.g., based on the PAN for the consumer's payment account, a token for the consumer's payment account, etc.). Then, the authentication engine 120 sends a request for verification of the fingerprint data included in the biometric PIN (as retrieved from the authorization request), at 422, to the registry 110. The request includes at least the retrieved registry identifier for the consumer 114 and the fingerprint data for the consumer's biometric PIN. In response, the registry 110 verifies, at 424, the four fingerprints associated with the consumer's biometric PIN, based on reference fingerprints stored therein. Specifically, the registry 110 identifies and retrieves the biometric data set including the fingerprint data (or other biometrics) for the consumer 114 based on the registry identifier. Once retrieved, the registry 110 employs conventional methods to determine if the fingerprint data received from the authentication engine 120 matches the reference fingerprint data at the registry 110 (i.e., exactly, or within conventionally accepted standards and/or requirements, etc.). Once verified, or not, the registry 110 notifies, at 426, the authentication engine 120 that the fingerprint data is verified or not verified.

If one or more of the fingerprints provided with the biometric PIN do not match the reference fingerprint data at the registry (such that the registry notifies the authentication engine 120 that the fingerprint data is not verified), the authentication engine 120 will in turn determine that the consumer 114 is not verified. Thereafter, the authentication engine 120 and/or the payment network 106 will decline the transaction via an appropriate response to the merchant 102 (e.g., at operation 436, below, etc.). Alternatively, in one or more other embodiments, only the fingerprint data that is verified by the registry 110 may be converted to the actual PIN (in the manner described below), with extraneous biometric data ignored, such that the actual PIN may then be partial or incorrect. In this latter manner, the issuer 108 then determines whether to approve or decline the transaction based on the actual PIN, whether correct or partial or incorrect (with the authentication engine 120 and/or payment network 106 merely acting to convert, as described below, the verified information and transmit it to the issuer 108).

However, when the fingerprints provided with the biometric PIN are verified, the authentication engine 120 converts, at 428, the fingerprints to characters, based on the map for the consumer 114 and/or payment account stored in the data structure 122. Here, consistent with Table 1 and the example above, the authentication engine 120 converts the fingerprint for the consumer's right-hand middle finger to an "8," the fingerprint for the consumer's right-hand index finger to a "3," the fingerprint for the consumer's right-hand pinky finger to a "4," and the fingerprint for the consumer's right-hand ring finger to a "1." The conversion, by the authentication engine 120, results in the actual PIN of 8341. The authentication engine 120 then appends the actual PIN to the authorization request and sends, at 430, the authorization request along to the issuer 108 with the actual PIN included therein (e.g., in place of the biometric data, or elsewhere in the authorization request along with the biometric data or along with a biometric authentication indicator (as described above in the system 100), etc.).

In response, the issuer 108 checks, evaluates, etc., the payment account associated with the authorization request (e.g., as identified by the PAN, a token, etc.) to approve or decline the transaction, at 432, based on, at least in part, the actual PIN included in the authorization request matching a reference PIN associated with the consumer's payment account. The transaction may further be approved or declined based on the standing of the payment account, the funds available from the payment account, business rules (e.g., fraud prevention rules, etc.), etc.

Then, the issuer 108 sends the approve or decline response, i.e. generates an authorization reply, at 434, to the payment network 106, which then forwards, at 436, the authorization reply to the merchant 102. As is conventional, then, the merchant 102 generates a receipt for the transaction, at 438, and provides the receipt to the consumer 114, at 440 (e.g., physically, electronically, etc.).

In view of above, the systems and methods herein permit a consumer to use a biometric PIN as a mechanism to authenticate himself/herself, in connection with a payment account transaction. The biometric PIN provides the security of biometric authentication, but goes further, by utilizing multiple biometrics of the consumer to define a biometric PIN that may be mapped to an actual PIN for the consumer's payment account (which is then conventional and known to an issuer of the consumer's payment account). In this manner, biometric authentication may be employed by a payment network in a payment account transaction, without knowing/using the actual PIN of the payment account involved in the transaction (such that the actual PIN remains secret to the consumer and the issuer) and while making involvement of biometrics in connection with such authentication transparent to the issuer (such that the issuer is not aware of the consumer's biometrics and need not examine the consumer's biometrics). As such, with minimal impact, if any, to the issuer, the payment network affords a substantial improvement to authentication of the consumer for his/her payment account associated with the issuer.

Again, and as previously described, it should be appreciated that the functions described herein, in some embodiments, may be described in computer executable instructions stored on a computer-readable media, and executable by one or more processors. The computer readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) intercepting, by computing device, an authorization request associated with a transaction to a payment account, the authorization request including a series of biometric data associated with a consumer; (b) verifying the series of biometric data; (c) converting, by the computing device, the series of biometric data to an actual person identification number (PIN), the actual PIN including a series of characters; (d) appending, by the computing device, the actual PIN to the authorization request; and (e) transmitting the authorization request to an issuer associated with the payment account, thereby permitting the issuer to authenticate the consumer based on the actual PIN.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term "product" may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for use in authenticating a user in connection with a transaction, the method comprising:
   intercepting, by a computing device, a request associated with a transaction to an account, the request including a series of biometric data associated with a user;
   retrieving, by the computing device, from a data structure associated with the computing device, a registry identifier associated with the account;
   verifying, with a registry, the series of biometric data based on the registry identifier;
   in response to verification of the series of biometric data, converting, by the computing device, the series of biometric data to an actual personal identification number (PIN), the actual PIN including a series of characters;
   appending, by the computing device, the actual PIN to the request; and
   transmitting the request to an entity associated with the account, thereby permitting the entity to authenticate the user based, at least in part, on the actual PIN.

2. The method of claim 1, wherein the series of biometric data includes fingerprint data from at least two fingers associated with the user.

3. The method of claim 1, wherein verifying, with the registry, the series of biometric data includes:
   retrieving, at the registry, reference biometric data, from a data structure in the registry, based on the registry identifier; and
   verifying, with the registry, the series of biometric data against the reference biometric data.

4. The method of claim 3, further comprising creating and storing, in the data structure associated with the computing device, a map based on an assignment of characters for the actual PIN to the series of biometric data as received from the user; and
   wherein converting the series of biometric data to an actual PIN is based on the map.

5. The method of claim 1, wherein converting the series of biometric data to the actual PIN includes converting, based on a map stored in a data structure of the computing device and associated with the account, the series of biometric data to the actual PIN, the actual PIN including a series of numbers.

6. The method of claim 1, further comprising forwarding a reply for the transaction from the entity, in response to the request, to at least another entity involved in the transaction.

7. A non-transitory computer-readable storage medium including executable instructions for facilitating a payment account transaction based on a fingerprint personal identifier number (PIN), which when executed by at least one processor, cause the at least one processor to:
   store, in a data structure associated with the at least one processor, a map including a character corresponding to each of multiple fingerprints;
   receive an authorization request associated with a transaction to a payment account, the authorization request including fingerprint data;
   verify the fingerprint data, the fingerprint data being representative of a sequence of fingerprints received from a consumer, the sequence of fingerprints defining a fingerprint PIN;
   after the fingerprint data is verified, convert, based on the map, the fingerprint data to an actual PIN, the actual PIN including a series of the characters from the map with each of the characters in the series of characters corresponding, in the map, to one of the fingerprints in the sequence of fingerprints; and
   append the actual PIN to the authorization request, thereby permitting an issuer associated with the payment account to authenticate the consumer based on the actual PIN.

8. The non-transitory computer-readable storage medium of claim 7, wherein the executable instructions, when executed by the at least one processor, further cause the at least one processor to intercept the authorization request, the authorization request including the fingerprint data.

9. The non-transitory computer-readable storage medium of claim 7, wherein the executable instructions, when executed by the at least one processor, further cause the at least one processor to append a biometric authentication indicator to the authorization request, prior to the authorization request being transmitted to the issuer.

10. The non-transitory computer-readable storage medium of claim 9, wherein the executable instructions, when executed by the at least one processor, further cause the at least one processor to transmit the authorization request to the issuer after appending the actual PIN and the biometric authentication indicator to the authorization request.

11. The non-transitory computer-readable storage medium of claim 7, wherein the series of characters includes a series of numbers and/or letters.

12. The non-transitory computer-readable storage medium of claim 11, wherein the executable instructions, when executed by the at least one processor, further cause the at least one processor to:

retrieve a registry identifier associated with the payment account; and send a request for verification of the fingerprint data by a registry in order to verify the fingerprint data, the request including the registry identifier, whereby the registry is able to respond with a notification that the fingerprint data is either verified or not verified.

13. The non-transitory computer-readable storage medium of claim 7, wherein the executable instructions, when executed by the at least one processor, further cause the at least one processor to:

send a request to a registry for verification of registration fingerprint data received from the consumer in connection with a request by the consumer for the fingerprint PIN, the registration fingerprint data being representative of multiple fingerprints of the consumer;

when the registration fingerprint data is verified, create the map.

14. A system for use in facilitating payment account transactions, the system comprising a computing device configured, by an authentication engine, to:

receive an authorization request associated with a transaction to a payment account, the authorization request including a series of biometric data associated with a consumer;

retrieve a registry identifier for the consumer based on the authorization request;

verify, via a registry in communication with the computing device, the series of biometric data based on the registry identifier;

convert the series of biometric data to an actual personal identification number (PIN), the actual PIN including a series of characters;

append the actual PIN to the authorization request; and send the authorization request to an issuer associated with the payment account, the authorization request including the appended actual PIN, thereby permitting the issuer to authenticate the consumer based on the actual PIN.

15. The system of claim 14, further comprising the registry including a data structure, the data structure including multiple biometric data sets, each biometric data set associated with a registry identifier; and wherein the computing device is further configured, by the authentication engine, in order to verify the series of biometric data, to:

retrieve the registry identifier for the consumer from the data structure based on the authorization request; and send a request to the registry for verification of the series of biometric data, the request including the retrieved registry identifier; and wherein the registry is configured to:

verify the series of biometric data against one of the multiple biometric data sets, based on the retrieved registry identifier; and notify the computing device of the series of biometric data being verified or not verified.

16. The system of claim 15, wherein the computing device is further configured, by the authentication engine, to:

offer an option to the consumer to register a biometric PIN to the payment account;

receive, from the consumer, a series of registration biometric data and an assignment, the series of registration biometric data including data representative of a sequence of fingerprints, and the assignment including a number to be assigned to each of the fingerprints; and create a map between the fingerprints and the number to be assigned to each of the fingerprints when the series of registration biometric data is verified, and store the map in a data structure associated with the authentication engine.

17. The system of claim 16, wherein the computing device is further configured, by the authentication engine, to convert the series of biometric data to the actual PIN based on the map.

18. The system of claim 14, wherein the series of biometric data includes a sequence of fingerprints; and wherein the actual PIN includes a sequence of numbers.

* * * * *